United States Patent
Latapie et al.

(10) Patent No.: US 11,301,690 B2
(45) Date of Patent: Apr. 12, 2022

(54) MULTI-TEMPORAL SCALE ANALYTICS

(71) Applicant: Cisco Technology, Inc., San Jose, CA (US)

(72) Inventors: Hugo Mike Latapie, Long Beach, CA (US); Franck Bachet, Breval (FR); Enzo Fenoglio, Issy-les-Moulineaux (FR); Sawsen Rezig, Nanterre (FR); Carlos M. Pignataro, Cary, NC (US); Guillaume Sauvage De Saint Marc, Sevres (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/743,598

(22) Filed: Jan. 15, 2020

(65) Prior Publication Data

US 2020/0364466 A1    Nov. 19, 2020

Related U.S. Application Data

(60) Provisional application No. 62/847,245, filed on May 13, 2019.

(51) Int. Cl.
*G06K 9/00* (2006.01)
*G06N 3/08* (2006.01)
(Continued)

(52) U.S. Cl.
CPC ..... *G06K 9/00771* (2013.01); *G06K 9/00671* (2013.01); *G06K 9/6289* (2013.01);
(Continued)

(58) Field of Classification Search
CPC ............ G06K 9/00771; G06K 9/6289; G06K 9/00671; G06N 3/08
See application file for complete search history.

(56) References Cited

U.S. PATENT DOCUMENTS 8,073,254 B2   12/2011   Saptharishi et al.
9,563,843 B2    2/2017   Yufik
(Continued)

OTHER PUBLICATIONS

Donghui (A multi-temporal framework for high-level activity analysis: Violent event detection in visual surveillance—https://doi.org/10.1016/j.ins.2018.02.065—Available online Mar. 3, 2018—www.elsevier.com/locate/ins—Information Sciences 447 (2018) 83-103 ) (Year: 2018).*

(Continued)

*Primary Examiner* — Nasim N Nirjhar
(74) *Attorney, Agent, or Firm* — Polsinelli PC

(57) ABSTRACT

Systems, methods, and computer-readable for multi-temporal scale analysis include obtaining two or more timescales associated with one or more images. A context associated with a monitoring objective is obtained, based on real time analytics or domain specific knowledge. The monitoring objective can include object detection, event detection, pattern recognition, or other. At least a subset of timescales for performing a differential analysis on the one or more images is determined based on the context. Multi timescale surprise detection and clustering are performed using the subset of timescales to determine whether any alerts are to be generated based on entropy based surprises. A set of rules can be created for the monitoring objective based on the differential analytics and alerts or entropy based surprises, if any.

20 Claims, 9 Drawing Sheets

(51) Int. Cl.
*G06K 9/62* (2006.01)
*G06T 7/194* (2017.01)
*G06T 7/292* (2017.01)
*G06T 7/254* (2017.01)

(52) U.S. Cl.
CPC .............. *G06N 3/08* (2013.01); *G06T 7/194* (2017.01); *G06T 7/254* (2017.01); *G06T 7/292* (2017.01); *G06T 2207/20036* (2013.01); *G06T 2207/20081* (2013.01)

(56) References Cited

U.S. PATENT DOCUMENTS

| | | | |
|---|---|---|---|
| 2011/0043626 A1* | 2/2011 | Cobb | G06K 9/00771 |
| | | | 348/143 |
| 2014/0212853 A1* | 7/2014 | Divakaran | G09B 19/00 |
| | | | 434/236 |
| 2019/0156496 A1 | 5/2019 | Leduc | |
| 2019/0205773 A1* | 7/2019 | Ackerman | G06N 5/022 |
| 2019/0220967 A1 | 7/2019 | Bhatt et al. | |
| 2019/0370598 A1* | 12/2019 | Martin | G06K 9/6273 |

OTHER PUBLICATIONS

Mou et al., "Learning Spectral—Spatial—Temporal Features VIA A Recurrent Convolutional Neural Network Forchange Detection in Multispectral Imagery," IEEE Transactions on Geoscience and Remote Sensing, vol. 57, No. 2, Feb. 2019, pp. 924-935.

* cited by examiner

MULTI-TEMPORAL SCALE ANALYTICS

CROSS-REFERENCES TO RELATED APPLICATIONS

This application claims the benefit of U.S. Provisional Application No. 62/847,245, filed May 13, 2019, which is hereby incorporated by reference, in its entirety and for all purposes.

TECHNICAL FIELD

The subject matter of this disclosure relates in general to the field of multi-timescale analytics. More specifically, example aspects are directed to multi-temporal scale analytics for event/object detection and/or pattern recognition.

BACKGROUND

Machine learning techniques are known for collecting and analyzing data from different devices for various purposes. Monitoring systems which rely on information from a large number of sensors face many challenges in assimilating the information and analyzing the information. For instance, an operating center or control room for monitoring a school, a city, or a national park for potential threats may use video feeds from a large number of video sensors deployed in the field. Analyzing these feeds may largely rely on manual identification of potential threats. Sometimes multiple feeds streamed in to a control or operations room may be monitored by a small number of individuals. The quality of these streams may not be of high definition or captured at a high frames per second (FPS) speed due to cost and energy considerations for the sensors, bandwidth limitations, etc., e.g., for battery powered or solar powered sensors deployed in an Internet of Things (IoT) environment.

Thus, the monitoring system may not be sufficiently detailed to reveal small objects, small variations, etc., to the human eye, especially at long ranges from the sensors. Critical information can also be missed if personnel responsible for monitoring the video feed are tired, on a break, etc. There is a need for autonomous object detection, event detection, and/or pattern recognition techniques which can effectively address these and other related challenges.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
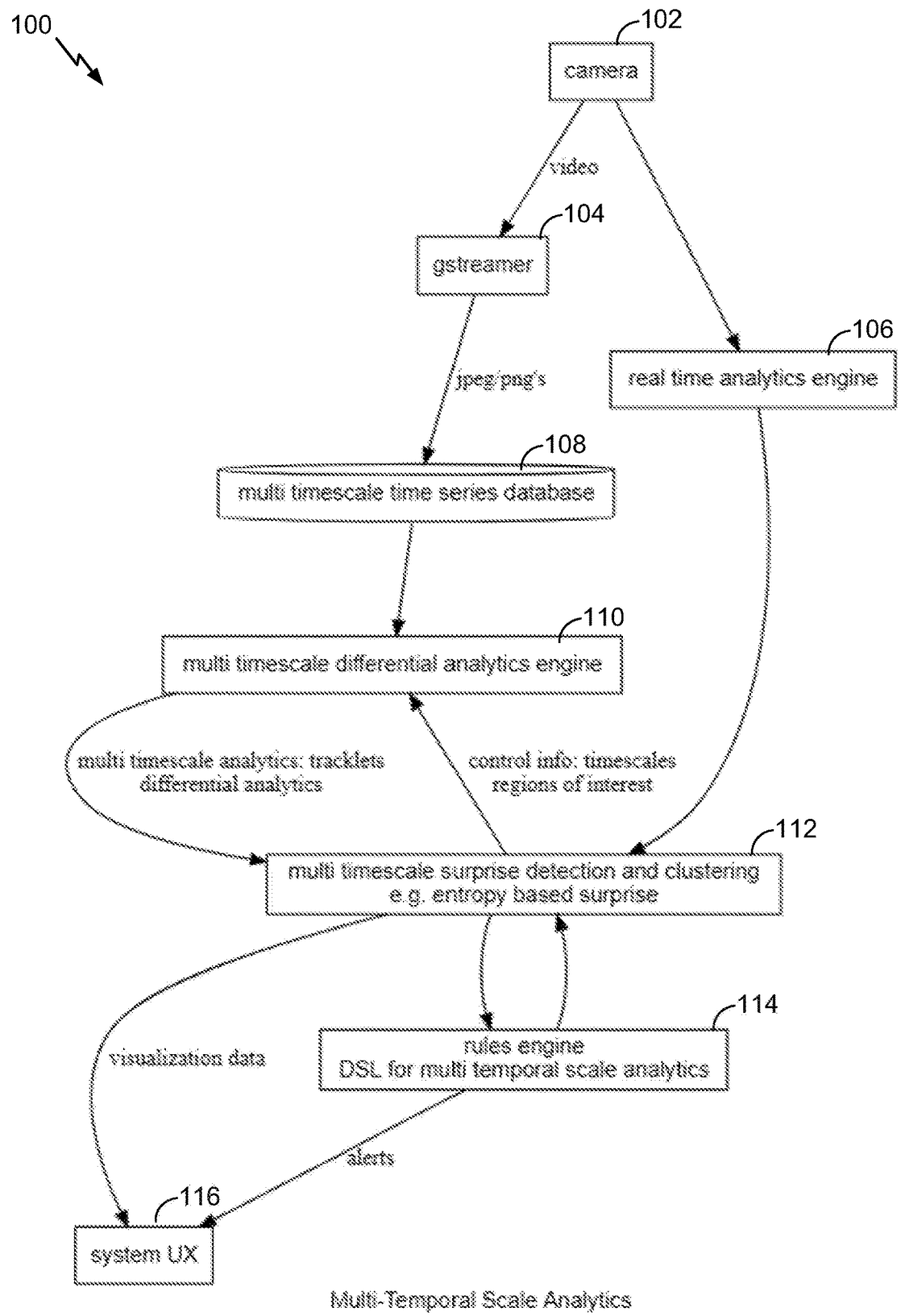
FIG. 1 illustrates an implementation of a multi-temporal scale analytics system in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable for multi-temporal scale analytics. In some examples, multi-temporal scale analytics tools according to this disclosure can be configured to study patterns evolving over different temporal scales, automatically recognize timescales of interest, and enable real time object/event detection. In some examples, differential analytics applied on multiple images or patterns obtained across different temporal scales can be used to detect or recognize dynamic patterns, events, objects, etc. In some examples, automatic ground truth generation techniques can be used for unsupervised or partially supervised machine learning algorithms.

For example, systems, methods, and computer-readable for multi-temporal scale analysis according to this disclosure include obtaining two or more timescales associated with one or more images. A context associated with a monitoring objective is obtained, based on real time analytics or domain specific knowledge. The monitoring objective can include object detection, event detection, pattern recognition, or other. At least a subset of timescales for performing a differential analysis on the one or more images is determined based on the context. Multi timescale surprise detection and clustering are performed using the subset of timescales to determine whether any alerts are to be generated based, for example, on techniques such as statistical estimation of the informational entropy associated with video flow descriptors. A set of rules can be created for the monitoring objective based on the differential analytics and alerts or entropy based surprises, if any.

In some examples, a method is provided. The method includes obtaining two or more timescales associated with one or more images; obtaining a context associated with a monitoring objective; determining at least a subset of timescales from the two or more timescales based on the context, the subset of timescales comprising one or more timescales for performing an analysis on the one or more images; and determining whether one or more alerts are to be generated based on the analysis.

In some examples, a system is provided. The system, comprises one or more processors; and a non-transitory computer-readable storage medium containing instructions which, when executed on the one or more processors, cause the one or more processors to perform operations including: obtaining two or more timescales associated with one or more images; obtaining a context associated with a monitoring objective; determining at least a subset of timescales from the two or more timescales based on the context, the subset of timescales comprising one or more timescales for performing an analysis on the one or more images; and determining whether one or more alerts are to be generated based on the analysis.

In some examples, a non-transitory machine-readable storage medium is provided, including instructions configured to cause a data processing apparatus to perform operations including: obtaining two or more timescales associated with one or more images; obtaining a context associated with a monitoring objective; determining at least a subset of timescales from the two or more timescales based on the context, the subset of timescales comprising one or more timescales for performing an analysis on the one or more images; and determining whether one or more alerts are to be generated based on the analysis.

In some examples of the methods, systems, and non-transitory machine-readable storage media, the monitoring objective comprises one or more of object detection, event detection, or pattern recognition.

In some examples of the methods, systems, and non-transitory machine-readable storage media, the context comprises one or more of a domain specific knowledge or real time analytics.

In some examples of the methods, systems, and non-transitory machine-readable storage media, the analysis comprises differential analytics on one or more images associated with the subset of timescales.

Some examples of the methods, systems, and non-transitory machine-readable storage media further comprise generating a set of rules for the monitoring objective based on the differential analytics and the one or more alerts if the one or more alerts are generated.

In some examples of the methods, systems, and non-transitory machine-readable storage media, the differential analytics includes a deep learning model, wherein one or more ground truths for the deep learning model are based on the set of rules and the context.

In some examples of the methods, systems, and non-transitory machine-readable storage media, obtaining the two or more timescales associated with the one or more images comprises obtaining the two or more timescales from two or more time series databases associated with the one or more images.

In some examples of the methods, systems, and non-transitory machine-readable storage media, the one or more alerts comprise an entropy based surprise.

This overview is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DESCRIPTION OF EXAMPLE EMBODIMENTS

Disclosed herein are systems, methods, and computer-readable media for multi-temporal scale analytics. In some examples, the multi-temporal scale analytics can be utilized for learning patterns evolving over different temporal scales, e.g., seconds, hours, days, and weeks. In some examples, differential analytics can be applied across various images or video frames obtained over different time scales. Machine learning techniques can be used to detect patterns using the differential analytics. In some examples a database of timescales of interest for a particular environment can be created and updated with detected patterns, objects, or events. The database can yield training information and enable partially supervised or unsupervised learning. It is possible to utilize the multi-temporal scale analytics to reveal patterns, objects, events, or other information which may not be possible to detect with a regular time scales of observation.

In an example, a video feed of a geographic region of interest can include one or more images or video frames. It may be desirable to detect, for example, footprints on a floor or ground, signs of an animal or person having passed through (e.g., changes or damages to branches or foliage which can indicate this), or one or more objects or events of interest. Differential analysis can reveal some of this information. For example, comparing an image just prior to a foot print having been implanted and an image after the foot print has been implanted can reveal the presence of the foot print. However, locating such images from a constant video feed comprising video frames obtained over several weeks or months can be a challenge. While some information can be obtained by analyzing images separated by a particular timescale, obtaining other information may not be possible by applying the same timescale for differential analysis. For example, if detection of foot prints can be possible using images obtained at a timescale having a granularity of minutes, aspects such as changes in daylight patterns may be better served by observing images obtained at a granularity of hours.

In another example, shifts in a camera's positions may be identified by detecting changes in images captured by the camera at different points in time, which changes can be attributable to different viewpoints (caused due to the shifts) but not due to changes in the scenery alone. For instance, studying images from the camera at varying intervals or temporal scales can reveal patterns which can be used to identify variations in viewing angles based on relative changes in position between images at different points in time for any stationary objects detected in the images. By detecting such shifts, actuators may be used for readjusting the camera's position back to a desired or original location. The ability to detect and correct variations in a camera's position may be useful in deployments of camera sensors in remote areas where frequent manual inspection may not be feasible.

Some events or patterns may be observable from studying images obtained at timescales of smaller (e.g., seconds/milliseconds) or larger units (e.g., weeks, months, years, etc.). Since events and patterns have an optimal timescales over which the samples are relevant and can vary based on the information of interest. An aspect of the multi-temporal analytics can include identifying the optimal timescale associated with the information of interest, for example, through autocorrelation, specifically, selecting the time lag where the autocorrelation function has its first minimum or reaches zero. In some other examples, machine learning or deep learning techniques can be used for identifying the timescale of interest.

In some examples, if an estimated timescale leads to successful detection of objects or patterns of interest, confidence scores or other metrics or feedback mechanisms can be used to update a learning model for the timescale identification.

In some examples, detection of multi-temporal scale correlations around events of interest may be enabled. For example, studying images from different time intervals around an event of interest, such as an identification of a dead animal can reveal activity before/after the dead animal was detected in a camera's feed, which can lead to detection of poachers who may have been involved.

In some examples, entropy based surprise detection techniques are provided. For example, using a multi-temporal scale analytics tool, identification of expected patterns is possible. Furthermore, deviations or anomalies from the expected patterns can also be identified in some examples. Surprise detections can include automatic detection of such anomalies based on analyzing information obtained using a multi-temporal analytics tool.

In some examples, statistical learning techniques (e.g., machine learning (ML), deep learning (DL), etc.) are disclosed for analyzing implicitly correlated data for improving object detection and object recognition. In some examples, automatic ground truth generation, labeling, and self-calibration techniques are provided for automatic timescale detection.

FIG. 1 illustrates a multi-temporal scale analytics system 100. In some examples, the system 100 can be configured for automatic timescale detection for one or more monitoring objectives such as pattern recognition, event detection, motion detection, object detection, differential analysis, or other. In some examples, the system 100 can implement various unsupervised machine learning techniques for automatically identifying one or more timescales of interest. In some examples, the system 100 can be configured for analyzing information in different timescales or combinations thereof. System 100 can implement one or more machine learning techniques for timescale detection and use of one or more detected timescales in the example monitoring objectives. FIG. 1 provides a broad overview of example components of the system 100. A detailed discussion of the various functional blocks illustrated in FIG. 1 will be provided in the following sections.

In some examples, the system 100 can obtain images from one or more cameras such as a camera 102. In this disclosure, the term "images" can include still images, video frames, or other. For example, references to one or more images can include one or more still images and/or one or more video frames. For example, the system 100 can obtain one or more images including still images, video frames, or other types of image information from the camera 102. In some examples, the camera 102 can include an Internet protocol camera (IP camera) or other video capture device for providing a sequence of picture or video frames. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

In some examples, the camera 102 can be used to send and receive data via a computer network implemented by the system 100 and/or the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. One or more remote commands can also be transmitted for pan, tilt, zoom (PTZ) of the camera 102. In some examples, the camera 102 can support distributed intelligence. For example, one or more analytics can be placed in the camera 102 itself, while some functional blocks of the system 100 can connect to the camera 102 through one or more networks. In some examples, one or more alarms for certain events can be generated based on analyzing the images obtained from the camera 102. A system user interface (UX) 116 can connect to a network to obtain analytics performed on images obtained from the camera 102, provide notifications or outputs to a user, and/or manipulate the camera 102 or settings thereof, among other features.

In some examples, the analytics performed by the system 100 can include immediate detection of events of interest as well as support for analysis of pre-recorded video or images obtained from the camera 102 for the purpose of extracting events occurring over a long period of time, as well as many other tasks.

In some examples, the images or video frames obtained from the camera 102 can be provided to a multimedia processing system 104 (e.g., a GStreamer or other). The multimedia processing system 104 can be used for various aspects of formatting, converting, gathering, exporting, or other actions of processing the output from the camera 102. In some aspects, other media content such as audio, or other input such as thermal imaging, radar imaging, etc., can also be used to package and format the media information. In some examples, the multimedia processing system 104 can support a wide variety of media-handling components, including media playback, recording, streaming, editing, etc. The multimedia processing system 104 can include a pipelined architecture which can be used for various multimedia applications such as video editors, transcoders, streaming media broadcasters, etc. In some examples, outputs from the multimedia processing system 104 in any suitable format can be stored in a database from which recordings or stored content can be accessed. For example, a multi timescale time series database 108 can be provided in system 100.

Figure 2:
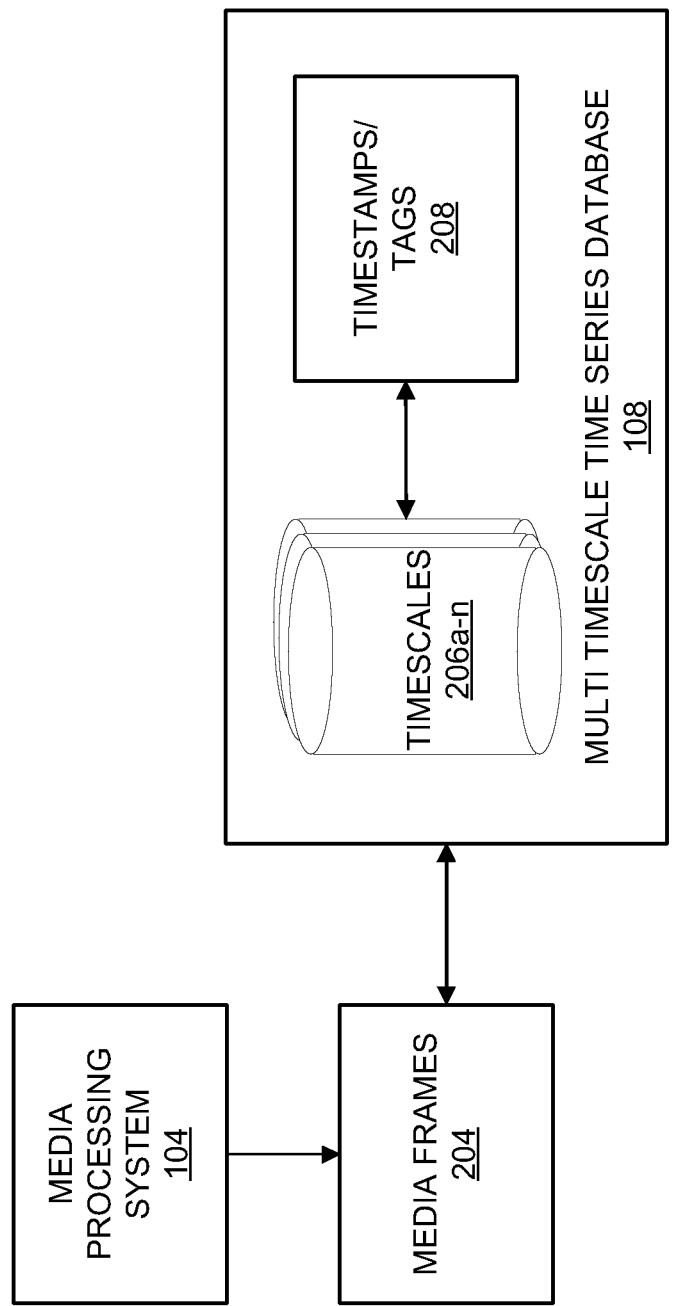
FIG. 2 illustrates an implementation of a multi timescale time series database, in accordance with some examples.

FIG. 2 is a block diagram illustrating an example implementation of a multi timescale time series database 108. The multi timescale time series database 108 can store media content from the multimedia processing system 104. In an example, media frames 204 can include media output from the multimedia processing system 104 in a specified format (e.g., a picture format, a movie format, or other). In some examples, the multi timescale time series database 108 can include one or more stores for media files of different timescales. For example, databases for timescales 206a-n can include media files classified according to different timescales, such as seconds, minutes, hours, days, etc. In some examples, the databases for timescales 206a-n can include pointers at corresponding timescales to a central database. In an illustrative example, the media frames 204 from a particular video feed can be stored in a central database and a database for timescales 206a can include pointers to or media content at a first granularity, a database for timescales 206b can include pointers to or media content at a second granularity, and so on. The specific timescale(s) to be used for a particular monitoring objective can change, and learning algorithms can be used to identify one or more timescales or combinations thereof for use in a particular pattern or object detection. In some examples, upon identifying particular timescales 206a-n for a desired monitoring objective, one or more timestamps or tags can be used to associate a monitoring objective with one or more timescales 206a-n.

For example, in the case of identifying footprints on a surface, the monitoring objective can include pattern detection associated with identifying footprints. One or more timescales 206a-n for such an example can include timescales in the order of minutes or hours, because there may be a possibility for footprints to fade or be obfuscated if larger timescales are considered. In some examples, the machine learning techniques discussed below can be used to identify one or more timescales 206a-n for this monitoring objective to include timescales for minutes and hours. In some examples, multi timescale time series database 108 can include a timestamps/tags engine to include tags or other associations between the monitoring objectives and their corresponding one or more timescales 206a-n. Furthermore, if one or more objects or events of interest are detected at particular points in time, timestamps can be added to specify the occurrence of such events or identifications of objects. Accordingly, the recordings can be annotated for the appropriate timescales to enable feedback for the learning algorithms as well as to provide training information.

In some examples, determining the one or more timescales of interest can include ground truths or training data. In some examples, users or system input can be provided based on a best guess for a particular monitoring objective. Various machine learning systems discussed below can be used to determine which timescales have commonalities and allow clustering and grouping timestamps in timescales which display periodicity. In some examples, differential analysis on one or more images of different timestamps can be performed (e.g., images obtained from a database for a particular timescale).

In some examples, a real time analytics engine 106 can be used to extract image features, perform object detection, pattern recognition, or other analysis on the video feed from the camera 102. The real time analytics engine 106 can be deployed to determine any uncertainties associated with the object/pattern detection, which can be used for identifying any entropy based surprises. This can be done in different ways, including, for example, comparing the entropies of two stochastic distributions, considering the relative entropy among them, or other techniques. In parallel, the information obtained from the multi timescale time series database 108 can be analyzed by a multi timescale differential analytics engine 110 discussed with reference to FIG. 3 below. For instance, the real time analytics engine 106 can detect moving objects or track moving objects. In some cases, bounding boxes or other mechanisms can be used to associate detected objects with trackers. The real time analytics engine 106 can include one or more of an intrusion detector, a video counter (e.g., by counting people, objects, vehicles, or the like), a camera tamper detector, an object left detector, an object/asset removal detector, an asset protector, a loitering detector, and/or as a slip and fall detector. The real time analytics engine 106 can further be used to perform various types of recognition functions, such as face detection and recognition, license plate recognition, object recognition (e.g., animals, birds, vehicles, or the like), or other recognition functions. In some cases, real time analytics engine 106 can be configured to use the video feed from the camera 102 to create training data for recognizing certain objects using user input or supervised learning functions. In some instances, event detection can be performed including detection of fire, smoke, fighting, crowd formation, or any other suitable event the real time analytics engine 106 is programmed to or learns to detect. A detector can trigger the detection of an event of interest and can send an alert or alarm to a central control room to alert a user of the event of interest.

Figure 3:
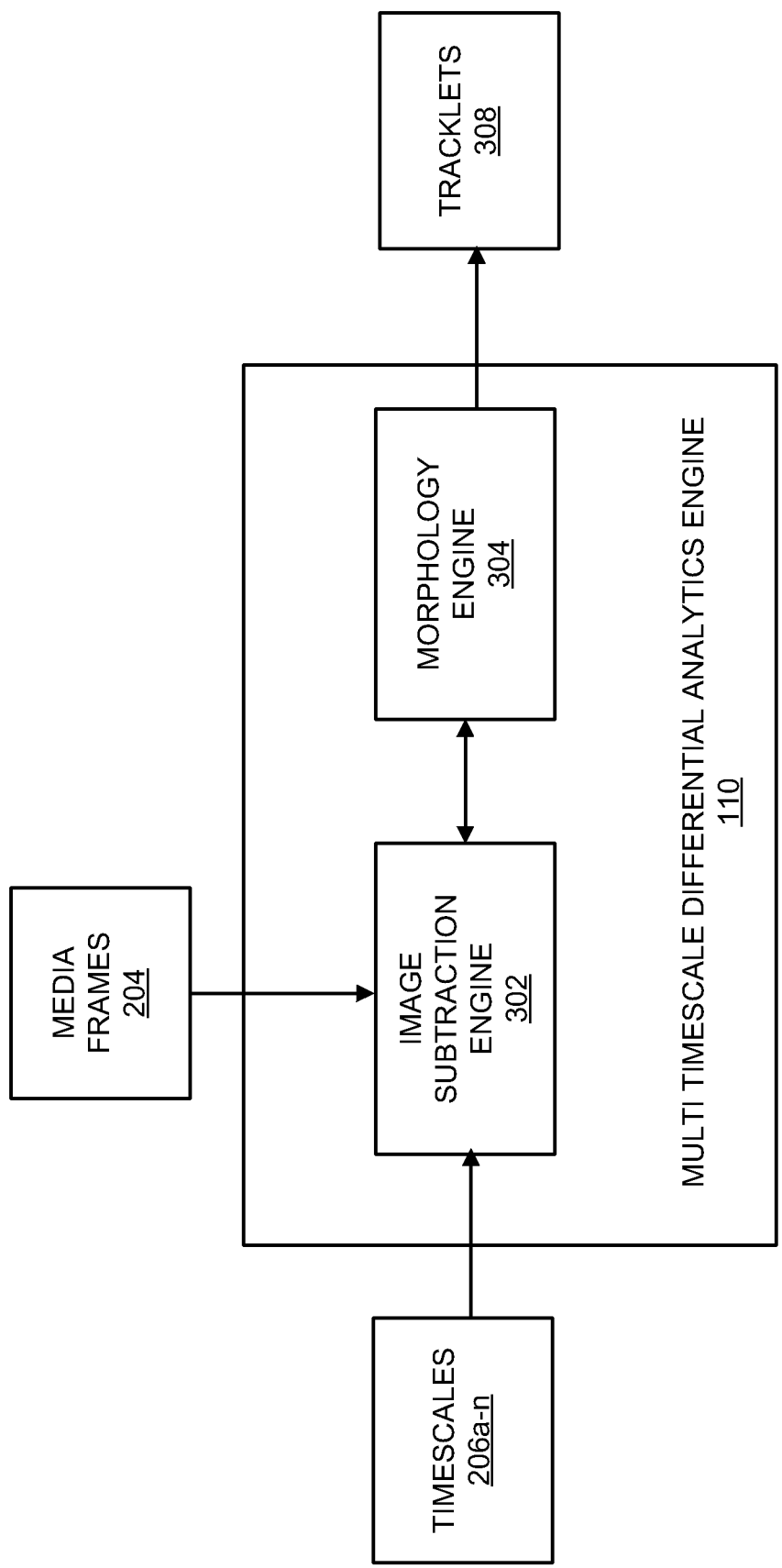
FIG. 3 illustrates an implementation of a multi timescale differential analytics engine, in accordance with some examples.

FIG. 3 is a block diagram illustrating an example of a multi timescale differential analytics engine 110. In some examples, the multi timescale differential analytics engine 110 can implement differential analytics on one or more media frames 204 from the multimedia processing system 104 and the one or more timescales 206a-n obtained from the multi timescale time series database 108. In some examples, computer vision (CV) aided approaches can be used to analyze two or more images at suitable timescales. An image subtraction engine 302 can be used to perform differential analysis.

For example, differential analysis performed on images separated by a matter of minutes can provide information such as the introduction of footprints in an environment. The detection enabled by a particular timescale can then be estimated. For example, features extracted from the analysis at a timescale of minutes can include footprint detection. The footprint detection can then be performed at other timescales to determine whether there is likely success at a different timescale. Different patterns may be observed with a certain confidence or accuracy level at some timescales but not others. Accordingly, differential calculation on a sequence of multiple images at different timescales can be performed.

In some examples, the image subtraction engine 302 can implement subtraction techniques, but other techniques are also possible, to detect objects or motion based on difference between frames. In some examples, moving objects can be segmented from a global background in a scene. The image subtraction engine 302 can perform background subtraction to detect foreground pixels in one or more of the media frames 204 separated by a particular timescale 206. For example, the image subtraction can be used to segment moving objects from the global background in a video sequence and to generate a foreground-background binary mask (referred to herein as a foreground mask). In some examples, the image subtraction can perform a subtraction between a current frame or picture and a background model including the background part of a scene (e.g., the static or mostly static part of the scene). Based on the results of background subtraction, a morphology engine 304 to group the foreground pixels and remove noisy pixels as well as to smooth the foreground mask. The image subtraction engine 302 can also model the background of a scene (e.g., captured in the video sequence according to a specific timescale) using any suitable background subtraction technique (also referred to as background extraction). One example of an image subtraction method used by the image subtraction engine 302 includes modeling the background of the scene as a statistical model based on the relatively static pixels in previous frames at specified timescales which are not considered to belong to any moving region. For example, the image subtraction engine 302 can use a Gaussian distribution model or a Gaussian Mixture model (GMM) to allow more complex multimodal background models, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model.

The image subtraction techniques mentioned above are based on the assumption that the camera is mounted still, and if anytime the camera is moved or orientation of the camera is changed, a new background model may be calculated. There are also image subtraction methods that can handle foreground subtraction based on a moving background, including techniques such as tracking key points, optical flow, saliency, and other motion estimation based approaches.

The image subtraction engine 302 can generate a foreground mask with foreground pixels based on the result of background subtraction. Using the foreground mask generated from background subtraction, a morphology engine 304 can perform morphology functions to filter the foreground pixels and eliminate noise. The morphology functions can include erosion and dilation functions. An erosion function can be applied to remove pixels on object boundaries. A dilation operation can be used to enhance the boundary of a foreground object. In some examples, an erosion function can be applied first to remove noise pixels, and a series of dilation functions can then be applied to refine the foreground pixels.

In some examples, the differential analytics obtained from subtraction (and possible enhancements through morphology functions) can be packaged as tracklets 308 or any other suitable dynamic data container. The tracklets 308 can include objects or patterns obtained from the image subtraction engine 302 and associations with respective timescales 206a-n corresponding to the images used by the image subtraction engine 302. For example, the differential analytics can be associated with respective timescales through the use of the tracklets 308. In some examples, the tracklets 308 can be used in classification functions. For example, the tracklets 308 associated with a specific timescale can be studied to determine patterns or clusters.

Figure 4:
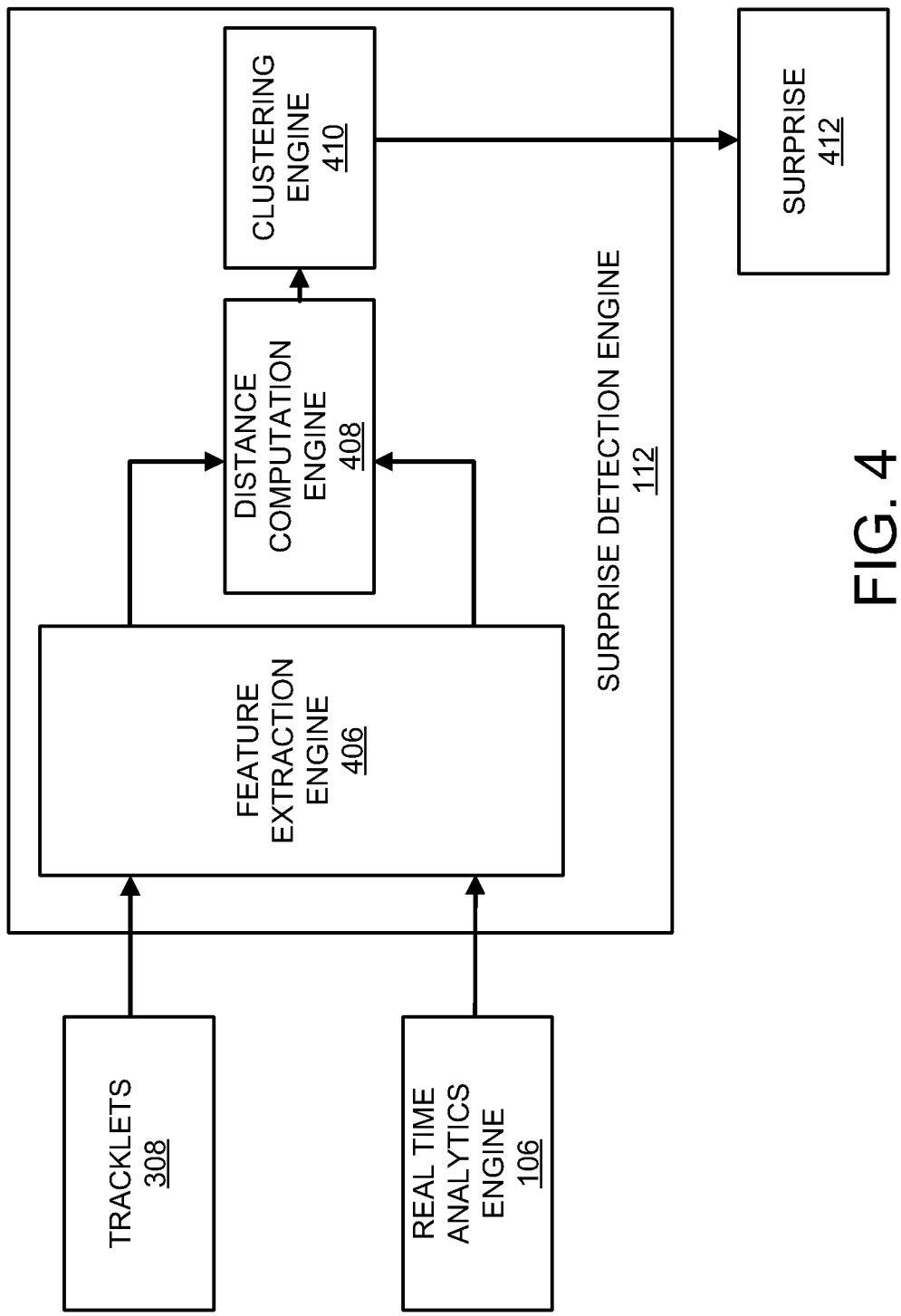
FIG. 4 illustrates an implementation of surprise detection engine, in accordance with some examples.

FIG. 4 is a block diagram illustrating an example of a surprise detection engine 112. The surprise detection engine 112 can be configured to determine if there are anomalies, and also associate scores with any such anomalies. For example, if a particular set of tracklets 308 associated with a timescale identify an object or event, the identified object or event can be evaluated for anomalies. In some examples, the real time analytics engine 106 can provide context. For example, a baseline pattern can be established using the real time analytics engine 106. For example, if there are intrusion detections identified in the real time analytics then the tracklets 308 or other information can be used to determine if this is a threat. For example, what may be considered an anomaly or a surprise may depend on context. Each context may have different interpretations. The context can be user generated/provided and/or determined from real time data. The tracklets 308 can be analyzed to determine if there are anomalies at different timescales. If there tracklets 308 in multiple timescales pointing to a n event identified by the real time analytics engine 106, this information can be used in establishing context. For example, if the real time analytics engine 106 detects an intrusion at a certain time of the day, but that intrusion is identified to be a regular occurrence based on tracklets 308 corresponding to timescales for hours or days, then there may not be an anomaly. However, tracklets 308 for other timescales (such as minutes) could suggest an anomaly. Thus, in some examples, clustering algorithms can be used to coalesce information from different tracklets and identify timescales at which the corresponding tracklets may have the largest variation or the smallest variation. Such analysis can provide suggestions of surprise or entropy changes of significance.

In some examples, there may be scores or confidence values associated with any identified surprises. For example, there may be false positives, false negatives, or other inconsistencies between the suggestions generated. In some examples, the uncertainty analytics can determine similarities, dissimilarities, and/or uncertainties in the surprise detection. The surprise detection engine 112 can have various components, including a feature extraction engine 406, a distance computation engine 408 (e.g., stochastic distance), and a clustering engine 410.

In some examples, the feature extraction engine 406 can extract features from the real time analytics engine 106 and corresponding features from the tracklets 308 at various timescales. For example, in the case of intrusion detection, motion information identified by the real time analytics engine 106 can be extracted along with associated time stamps. The tracklets 308 can be analyzed to determine whether there are corresponding images/motion detection information at time instances which are separated from the time stamps. Different tracklets 308 can include images at different separations in time from the time stamps, based on their timescales.

The distance computation engine 408 can compute a distance between images from the real time analytics engine 106 and corresponding images from different tracklets 308. The clustering engine 410 can cluster images which may have close correlations or similarities in different timescales. In some examples, these clustered images can be the object of further analysis to determine whether there are surprises. If, in the above illustrative examples, it has been identified that there is an expected intrusion at a particular timescale for the timestamp of interest but not at another timescale (e.g., a ranger was expected to conduct a routine check at a particular time every day but an intrusion was detected at another time separated by a few hours from the expected time), then a surprise detection can be generated. One or more such surprise 412 can be output from the surprise detection engine 112. In some examples, information entropy can be used in identifying and generating the output surprise 412. Information entropy refers to the amount of information in a variable, which may be translated to the amount of storage required to store the variable. The less "surprise" in the variable, the less amount of information or entropy the variable has. The entropy may also be described as disorder or uncertainty, analogous to statistical thermodynamics. A concept introduced by Claude Shannon, provides a measure of information entropy in units referred to as "shannons". The surprise 412 can be provided in units of shannon or bit, or nat or other, and can refer to any type of amount of information or uncertainty or disorder detected.

Figure 5:
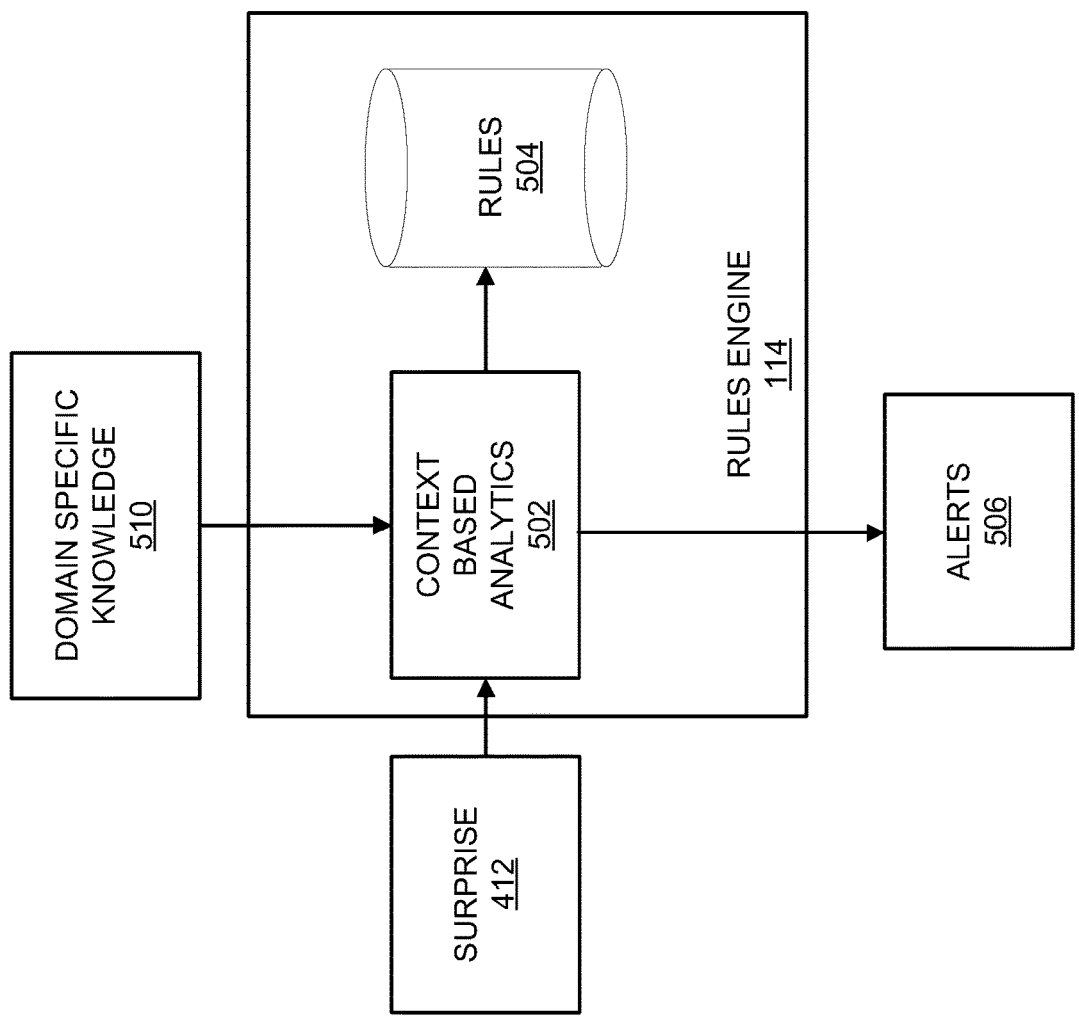
FIG. 5 illustrates an implementation of a rules engine, in accordance with some examples.

FIG. 5 is block diagram of a rules engine 114 for analyzing surprises in terms of context. In some example, domain specific knowledge 510 can be provided as input. The domain specific knowledge can include any ground rules or training data. For example, a user may provide information on schedules for rangers or staff, routes of travel, or other information to the system 100 for use in identifying patterns. Such patterns can be useful in training the system and also detecting any deviations. In some examples, a context based analytics engine 502 can be provided for evaluating any surprises 412 with the domain specific knowledge 510. For example, an event flagged as a surprise 412 may be evaluated based on domain specific knowledge such as a known schedule deviation for a particular day. If the event is an unexpected intrusion detected based on the surprise detection engine 112, but may be an expected event based on a known deviation to a ranger's schedule, for example, then there may be no alarm generated. Otherwise, an alert 506 can be triggered to flag the surprise 412 as an event to be further investigated or handled by an operator (e.g.,the alert 506 may be provided via the system UX 116). In some examples, a rules database 504 can be created with a set of rules and updated using the context based analytics 502. The rules 504 can continue to evolve as the system 100 is used for multi-temporal scale analytics. The rules 504 can include various associations between patterns and timescales and can be used for training other blocks.

Figure 6:
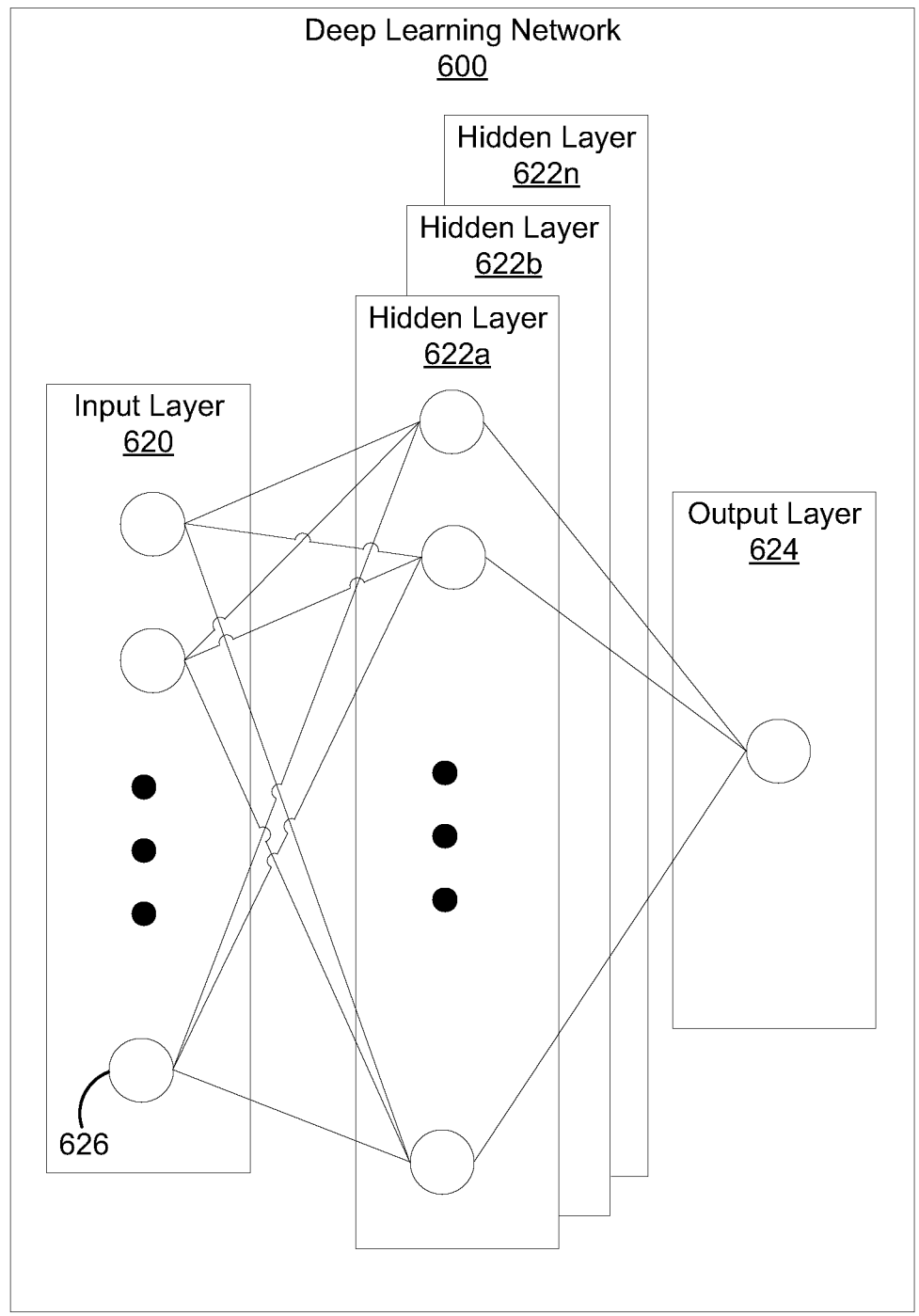
FIG. 6 illustrates a deep learning neural network, in accordance with some examples.

FIG. 6 is an illustrative example of a deep learning neural network 600 that can be used by the system 100. An input layer 620 includes input data. In one illustrative example, the input layer 620 can include data representing the pixels of an input video frame. The deep learning neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. The deep learning neural network 600 further includes an output layer 624 that provides an output resulting from the processing performed by the hidden layers 622a, 622b, through 622n. In one illustrative example, the output layer 624 can provide a classification and/or a localization for an object or event identified in an input video frame along with a timescale. The classification can include a class (e.g., a footprint) and the localization can include a timestamp at which the footprint was detected, along with a relevant timescale for such detection.

The deep learning neural network 600 is a multi-layer neural network of interconnected nodes. Each node can represent a piece of information. Information associated with the nodes is shared among the different layers and each layer retains information as information is processed. In some cases, the deep learning neural network 600 can include a feed-forward network, in which case there are no feedback connections where outputs of the network are fed back into itself. In some cases, the deep learning neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the hidden layer 622 can transform the information of each input node by applying activation functions to this information. The information derived from the transformation can then be passed to and can activate the nodes of the next hidden layer 622b by a non-linear activation function, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 624, at which an output is provided. In some cases, while nodes (e.g., node 626) in the deep learning neural network 600 are shown as having multiple output lines, a node has a single output and all lines shown as being output from a node represent the same output value.

In some cases, each node or interconnection between nodes can have a weight that is a set of parameters derived from the training of the deep learning neural network 600. For example, an interconnection between nodes can represent a piece of information learned about the interconnected nodes. The interconnection can have a tunable numeric weight that can be tuned (e.g., based on a training dataset), allowing the deep learning neural network 600 to be adaptive to inputs and able to learn as more and more data is processed.

The deep learning neural network 600 is pre-trained to process the features from the data in the input layer 620 using the different hidden layers 622a, 622b, through 622n in order to provide the output through the output layer 624. In an example in which the deep learning neural network 600 is used for multi-temporal scale analytics, the deep learning neural network 600 can be trained using domain specific knowledge or training data that includes both patterns (or objects/events) and associated labels. For instance, training schedules or routines can be input into the network, with each training schedule having a label indicating the classes of the one or more objects or events to be expected for a particular timescale.

In some cases, the deep learning neural network 600 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the network 600 is trained well enough so that the weights of the layers are accurately tuned.

For the example of identifying objects in images, the forward pass can include passing a training image through the deep learning neural network 600. The weights are initially randomized before the deep learning neural network 600 is trained. For a first training iteration for the deep learning neural network 600, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the deep learning neural network 600 is unable to determine low level features and thus cannot make an accurate determination of what the classification of the object might be. A loss function can be used to analyze error in the output. Any suitable loss function definition can be used. One example of a loss function includes a mean squared error (MSE). The loss (or error) will be high for the first training images since the actual values will be much different than the predicted output. The goal of training is to minimize the amount of loss and find a set of weights and biases that have low loss, on average, across all samples. The deep learning neural network 600 can perform a backward pass by determining which inputs (weights) most contributed to the loss of the network, and can adjust the weights so that the loss decreases and is eventually minimized.

A derivative of the loss with respect to the weights can be computed to determine the weights that contributed most to the loss of the network. After the derivative is computed, a weight update can be performed by updating all the weights of the filters. The deep learning network 600 can include any suitable deep network. One example includes a convolutional neural network (CNN), which includes an input layer and an output layer, with multiple hidden layers between the input and out layers. The hidden layers of a CNN include a series of convolutional, nonlinear, pooling (for down sampling), and fully connected layers. The deep learning neural network 600 can include any other deep network element other than a CNN, such as a multi-layer perceptron (MLP), Recurrent Neural Networks (RNNs), among others.

Figure 7:
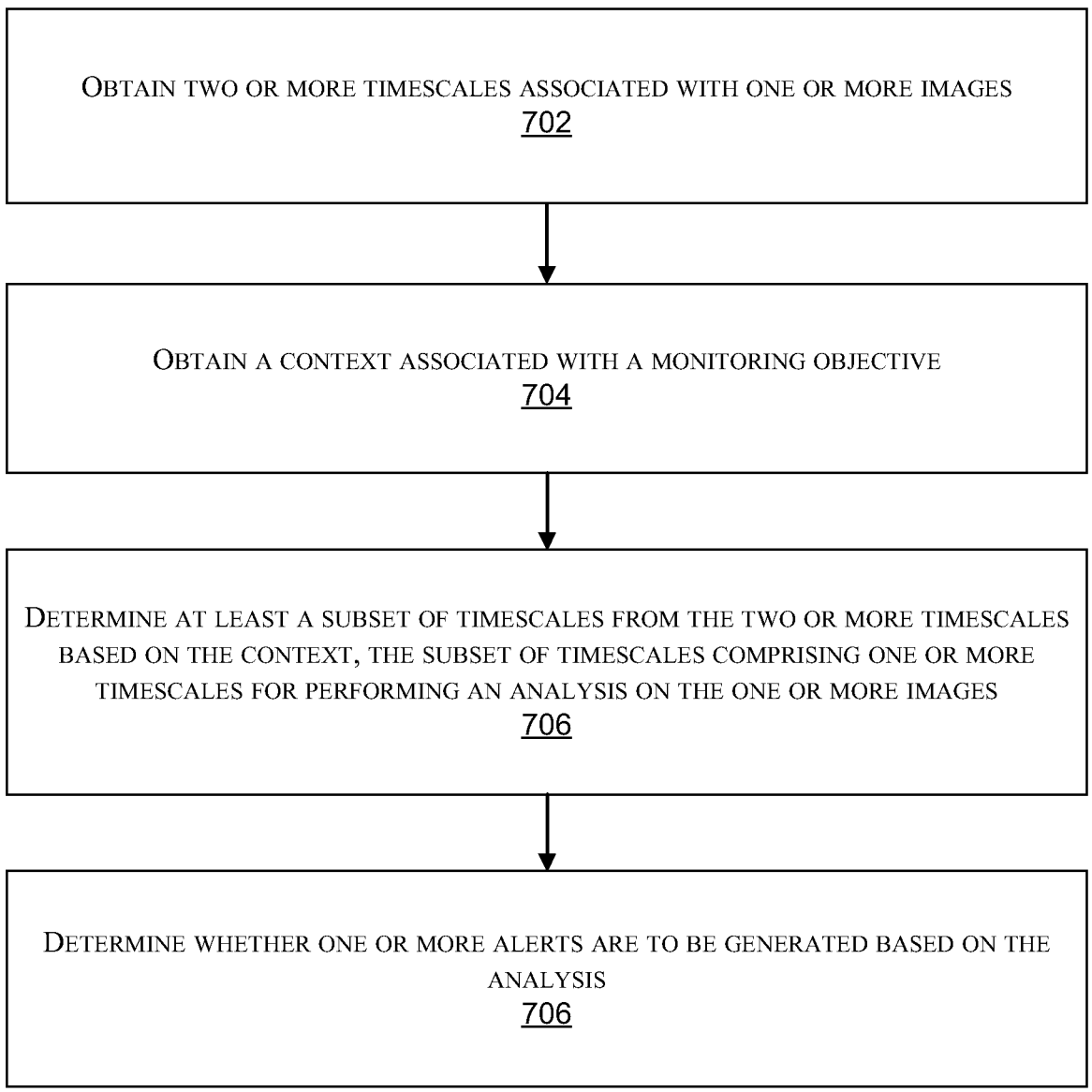
FIG. 7 is a flowchart illustrating a process of multi-temporal scale analytics, in accordance with some examples.

FIG. 7 illustrates a process 700 for analyzing one or more images using multi-temporal scale analytics. For example, the process 700 can be implemented in the system 100.

At step 702, the process 700 can include obtaining two or more timescales associated with one or more images. For example, the two or more timescales associated with the one or more images can be obtained from two or more time series databases associated with the one or more images. For example, the multi timescale time series database 108 can include timescale databases 206a-n for storing various timescales and their associations with the images or media frames 204 obtained from the multimedia processing system 104. In some examples, the multimedia processing system 104 can obtain the one or more images from the camera 102. In some examples, timestamps/tags 208 can be associated with the various timescales. For example, the timescales and their associations can be updated using deep learning or machine learning models and the timestamps/tags 208 can include indications for successful monitoring objectives.

At step 704, the process 700 can include obtaining a context associated with a monitoring objective. For example, the real time analytics engine 106, domain specific knowledge, or other can be used to provide context for a monitoring objective such as one or more of object detection, event detection, or pattern recognition.

At step 706, the process 700 can include determining at least a subset of timescales from the two or more timescales based on the context, the subset of timescales comprising one or more timescales for performing an analysis on the one or more images. For example, a multi timescale differential analytics engine 110 can perform differential analytics using the timescales 206a-n and the associated one or more images obtained from the media frames 204 to generate the tracklets 308, where the tracklets 308 can include the subset of timescales and associated metadata such as timestamps for a particular monitoring objective.

At step 708, the process 700 can include determining whether one or more alerts are to be generated based on the analysis. For example, the tracklets 308, along with the context (e.g., from the real time analytics engine 106) can be used by a surprise detection engine 112 to determine whether there are any surprises 412 (e.g., an entropy based surprise). The surprises 412, domain specific knowledge 510, or other information be used in context based analytics 502 implemented in the rules engine 114 to determine whether any alerts 506 are to be generated. In some examples, a set of rules 504 can be generated for the monitoring objective based on the differential analytics and the one or more alerts 506 if the one or more alerts 506 are generated. In some examples, the differential analytics can include a deep learning model (e.g., the deep learning network 600), wherein one or more ground truths for the deep learning model are based on the set of rules and the context.

In some examples, the training model, the alerts, or other visualization data from the surprise detection engine 112 can be provided to a system UX 116, and in some examples, user input can be received for the training data or other information from the system UX 116.

Figure 8:
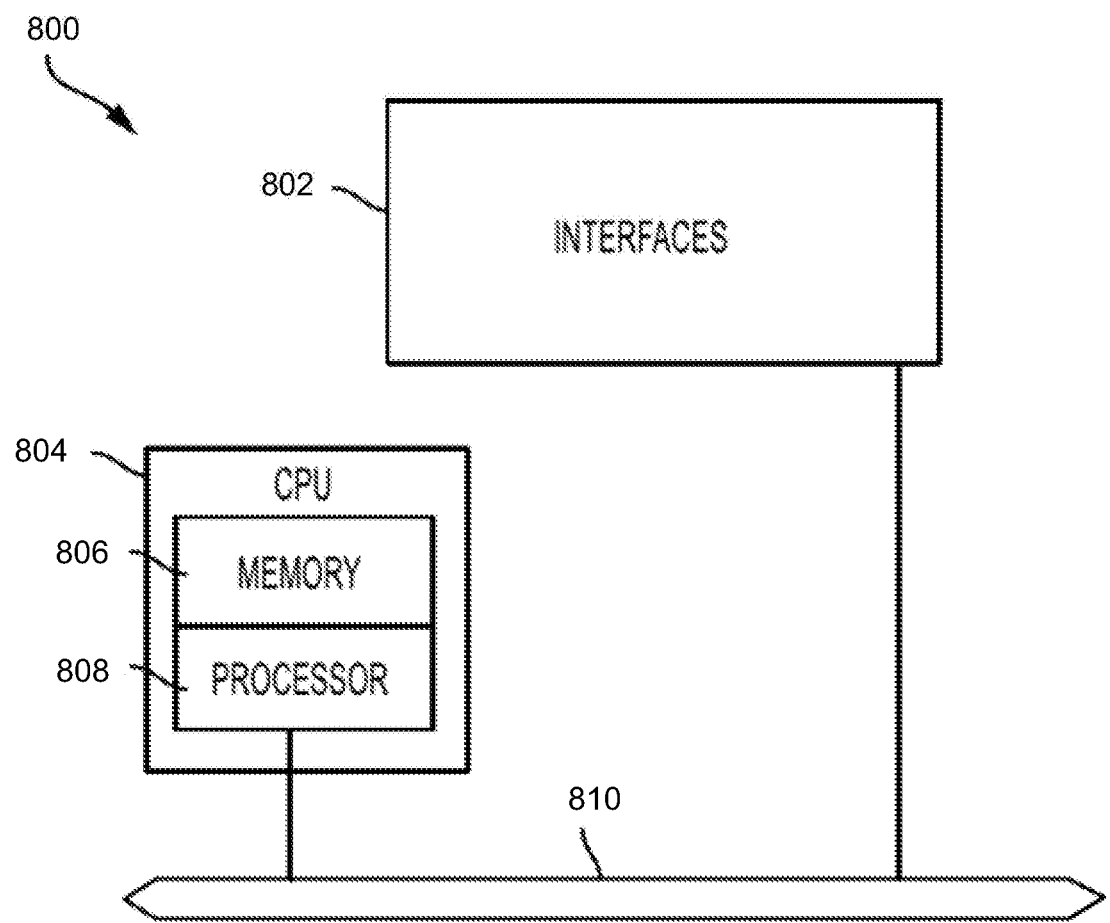
FIG. 8 illustrates a network device, in accordance with some examples.

FIG. 8 illustrates an example network device 800 suitable for implementing the aspects according to this disclosure. In some examples, the functional blocks of the system 100 discussed above, or others discussed in example systems may be implemented according to the configuration of the network device 800. The network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. The CPU 804 may include one or more processors 808, such as a processor from the INTEL X86 family of microprocessors. In some cases, processor 808 can be specially designed hardware for controlling the operations of the network device 800. In some cases, a memory 806 (e.g., non-volatile RAM, ROM, etc.) also forms part of the CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the connection 810, to exchange data and signals and coordinate various types of operations by the network device 800, such as routing, switching, and/or data storage operations, for example.

Figure 9:
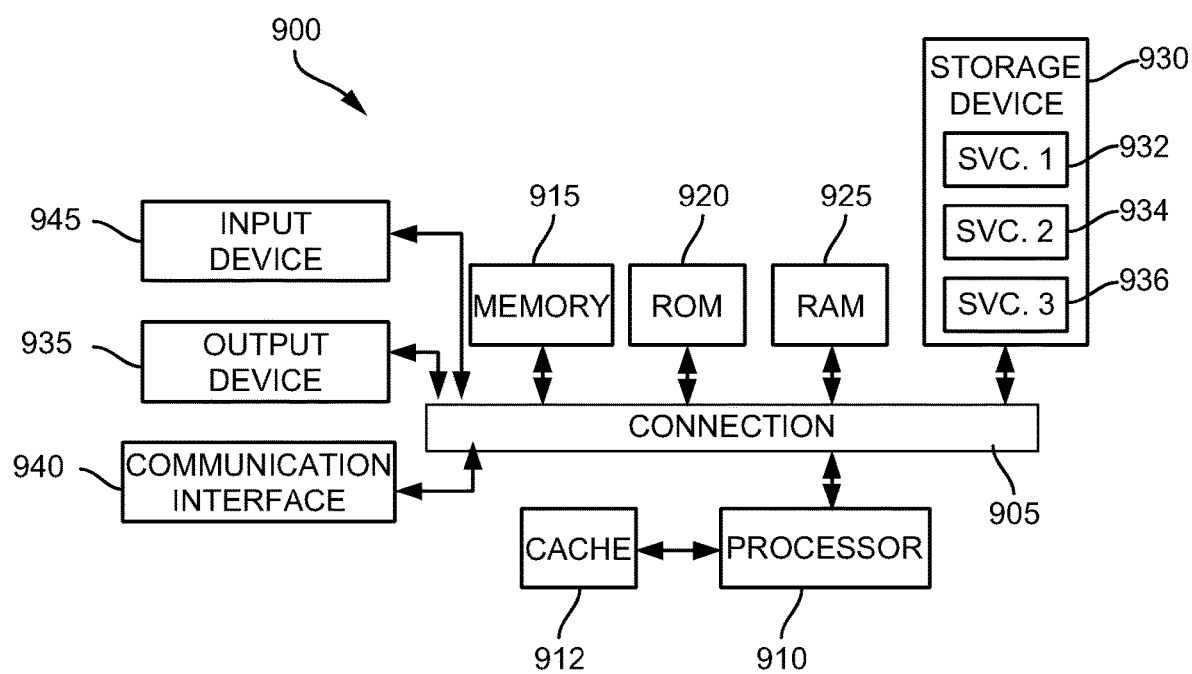
FIG. 9 illustrates an example computing device architecture, in accordance with some examples.

FIG. 9 illustrates an example computing device architecture 900 of an example computing device which can implement the various techniques described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method of analyzing a plurality of images, the method comprising:
    obtaining two or more timescales associated with the plurality of images, the plurality of images being captured at different intervals in time corresponding to the two or more timescales;
    obtaining a context associated with a monitoring objective, the context providing a baseline pattern for a context based analysis on the plurality of images, the context based analysis including evaluating flagged events with domain specific knowledge, the domain specific knowledge including a deviation from a known schedule;
    determining at least a subset of timescales from the two or more timescales based on the context, the subset of timescales comprising one or more timescales for performing the context based analysis on the plurality of images, wherein the one or more timescales comprise one or more first intervals in time from the different intervals in time corresponding to the two or more timescales, the one or more first intervals in time being smaller than one or more second intervals in time corresponding to the two or more timescales, the one or more first intervals in time being associated with the plurality of images captured at or within the one or more first intervals in time;
    calculating a stochastic distance between the plurality of images associated with the two or more timescales;
    clustering a subset of images of the plurality of images based on the stochastic distance between the plurality of images associated with the two or more timescales, the clustered subset of images of the plurality of images including a corresponding storage size;
    generating a score based on the storage size of the clustered subset of images of the plurality of images, the score being a high surprise score when the storage size is greater than a predetermined threshold and the score being a low surprise score when the storage size is less than the predetermined threshold; and
    generating one or more alerts based on the context based analysis and the surprise score associated with the clustered subset of images of the plurality of images.

2. The method of claim 1, wherein the monitoring objective comprises one or more of object detection, event detection, or pattern recognition.

3. The method of claim 1, wherein the context comprises one or more of a domain specific knowledge or real time analytics.

4. The method of claim 1, wherein the context based analysis comprises differential analytics on the plurality of images associated with the subset of timescales.

5. The method of claim 4, further comprising:
    generating a set of rules for the monitoring objective, the set of rules being based on at least one of the differential analytics and the one or more alerts.

6. The method of claim 5, wherein the differential analytics includes a deep learning model, wherein one or more ground truths for the deep learning model are based on the set of rules and the context.

7. The method of claim 6, wherein obtaining the two or more timescales associated with the plurality of images comprises obtaining the two or more timescales from two or more time series databases associated with the plurality of images.

8. The method of claim 1, wherein the one or more alerts comprise an entropy based surprise.

9. A system, comprising:
    one or more processors; and
    a non-transitory computer-readable storage medium containing instructions which, when executed on the one or more processors, cause the one or more processors to perform operations including:
        obtaining two or more timescales associated with a plurality of images, the plurality of images being captured at different intervals in time corresponding to the two or more timescales;
        obtaining a context associated with a monitoring objective, the context providing a baseline pattern for a context based analysis on the plurality of images, the context based analysis including evaluating flagged events with domain specific knowledge, the domain specific knowledge including a deviation from a known schedule;
        determining at least a subset of timescales from the two or more timescales based on the context, the subset of timescales comprising one or more timescales for performing the context based analysis on the plurality of images, wherein the one or more timescales comprise one or more first intervals in time from the different intervals in time corresponding to the two or more timescales, the one or more first intervals in time being smaller than one or more second intervals in time corresponding to the two or more timescales, the one or more first intervals in time being associated with the plurality of images captured at or within the one or more first intervals in time;
        calculating a stochastic distance between the plurality of images associated with the two or more timescales;
        clustering a subset of images of the plurality of images based on the stochastic distance between the plurality of images associated with the two or more timescales, the clustered subset of images of the plurality of images including a corresponding storage size;
        generating a score based on the storage size of the clustered subset of images of the plurality of images, the score being a high surprise score when the storage size is greater than a predetermined threshold and the score being a low surprise score when the storage size is less than the predetermined threshold; and
        generating one or more alerts based on the context based analysis and the surprise score associated with the clustered subset of images of the plurality of images.

10. The system of claim 9, wherein the monitoring objective comprises one or more of object detection, event detection, or pattern recognition.

11. The system of claim 9, wherein the context comprises one or more of a domain specific knowledge or real time analytics.

12. The system of claim 9, wherein the context based analysis comprises differential analytics on the plurality of images associated with the subset of timescales.

13. The system of claim 12, wherein the operations further comprise:
generating a set of rules for the monitoring objective based on at least one of the differential analytics and the one or more alerts.

14. The system of claim 13, wherein the differential analytics includes a deep learning model, wherein one or more ground truths for the deep learning model are based on the set of rules and the context.

15. The system of claim 14, wherein obtaining the two or more timescales associated with the plurality of images comprises obtaining the two or more timescales from two or more time series databases associated with the plurality of images.

16. The system of claim 9, wherein the one or more alerts comprise an entropy based surprise.

17. A non-transitory machine-readable storage medium, including instructions configured to cause a data processing apparatus to perform operations including:
obtaining two or more timescales associated with a plurality of images;
obtaining a context associated with a monitoring objective, the context providing a baseline pattern for a context based analysis on the plurality of images, the context based analysis including evaluating flagged events with domain specific knowledge, the domain specific knowledge including a deviation from a known schedule;
determining at least a subset of timescales from the two or more timescales based on the context, the subset of timescales comprising one or more timescales for performing the context based analysis on the plurality of images, wherein the one or more timescales comprise one or more first intervals in time from different intervals in time corresponding to the two or more timescales, the one or more first intervals in time being smaller than one or more second intervals in time corresponding to the two or more timescales, the one or more first intervals in time being associated with the plurality of images captured at or within the one or more first intervals in time;
calculating a stochastic distance between the plurality of images associated with the two or more timescales;
clustering a subset of images of the plurality of images based on the stochastic distance between the plurality of images associated with the two or more timescales, the clustered subset of images of the plurality of images including a corresponding storage size;
generating a score based on the storage size of the clustered subset of images of the plurality of images, the score being a high surprise score when the storage size is greater than a predetermined threshold and the score being a low surprise score when the storage size is less than the predetermined threshold; and
generating one or more alerts based on the context based analysis and the surprise score associated with the clustered subset of images of the plurality of images.

18. The non-transitory machine-readable storage medium of claim 17, wherein the monitoring objective comprises one or more of object detection, event detection, or pattern recognition.

19. The non-transitory machine-readable storage medium of claim 18, wherein the context comprises one or more of a domain specific knowledge or real time analytics.

20. The non-transitory machine-readable storage medium of claim 19, wherein the context based analysis comprises differential analytics on the plurality of images associated with the subset of timescales.

* * * * *